(12) United States Patent
Tashiro et al.

(10) Patent No.: US 8,223,684 B2
(45) Date of Patent: Jul. 17, 2012

(54) MOBILE COMMUNICATION SYSTEM, GATEWAY, CONCENTRATOR, AND HANDOVER CONTROL METHOD

(75) Inventors: Taichi Tashiro, Fuchu (JP); Keiji Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 664 days.

(21) Appl. No.: 12/328,508

(22) Filed: Dec. 4, 2008

(65) Prior Publication Data

US 2009/0147753 A1 Jun. 11, 2009

(30) Foreign Application Priority Data

Dec. 6, 2007 (JP) ................................. 2007-316364

(51) Int. Cl.
*H04B 7/14* (2006.01)
*H04W 4/00* (2009.01)
*H04W 36/00* (2009.01)
*H04L 12/56* (2006.01)

(52) U.S. Cl. ........ 370/315; 370/331; 370/338; 370/401; 455/442; 455/444

(58) Field of Classification Search .......... 370/310–350, 370/400–408; 455/431–444
See application file for complete search history.

(56) References Cited

U.S. PATENT DOCUMENTS

| | | | | |
|---|---|---|---|---|
| 5,974,036 | A * | 10/1999 | Acharya et al. | ................. 370/331 |
| 6,725,044 | B2 * | 4/2004 | Verma et al. | ................... 455/444 |
| 6,839,329 | B1 * | 1/2005 | Sato et al. | .................. 370/310.1 |
| 7,382,732 | B2 * | 6/2008 | Peisa et al. | ..................... 370/236 |
| 8,019,348 | B2 * | 9/2011 | Choi et al. | ..................... 455/442 |
| 2002/0067706 | A1 * | 6/2002 | Bautz et al. | .................... 370/331 |
| 2003/0086427 | A1 | 5/2003 | Lee et al. | |
| 2003/0189909 | A1 | 10/2003 | Chao et al. | |
| 2005/0147042 | A1 | 7/2005 | Purnadi et al. | |
| 2006/0019659 | A1 * | 1/2006 | Rosenberg et al. | ......... 455/432.1 |
| 2007/0218903 | A1 * | 9/2007 | Grech | ............................ 455/436 |
| 2008/0253334 | A1 * | 10/2008 | Torsner et al. | ................. 370/331 |

(Continued)

FOREIGN PATENT DOCUMENTS

EP 0 695 053 A3 2/1997

(Continued)

OTHER PUBLICATIONS

Combined Search and Examination Report issued by the United Kingdom Intellectual Property Office on Mar. 2, 2009, for UK Application No. GB 0822176.4.

*Primary Examiner* — Tri H Phan
(74) *Attorney, Agent, or Firm* — Finnegan, Henderson, Farabow, Garrett & Dunner, L.L.P.

(57) ABSTRACT

According to this invention, there is provided a method applicable to the system which comprises a plurality of base stations each forming radio zones and storing a mobile terminal, and a gateway being connected to a packet communication network and relaying packet communication between the packet communication network and the mobile terminal. The method comprises buffering packets transmitted by a downlink to the mobile terminal in a packet buffer, requiring retransmission of unarrived packets in handover accompanied by movement among the radio zones, reading the packet required from the mobile terminal to retransmit the packet to the mobile terminal that is a request source, and assigning serial identification numbers to packets at least in a start to an end of the handover. When the identification numbers of the reached packets are discontinuous, the mobile terminal requires retransmission of packets needed to eliminate the discontinuity.

13 Claims, 8 Drawing Sheets

U.S. PATENT DOCUMENTS

| | | | |
|---|---|---|---|
| 2009/0069015 A1* | 3/2009 | Yamamoto et al. | 455/437 |
| 2010/0284372 A1* | 11/2010 | Marinescu et al. | 370/332 |
| 2010/0322188 A1* | 12/2010 | Nagatake et al. | 370/331 |

FOREIGN PATENT DOCUMENTS

| | | |
|---|---|---|
| EP | 0 777 396 A1 | 6/1997 |
| EP | 1 253 736 A3 | 12/2003 |
| EP | 1 487 171 A1 | 12/2004 |
| GB | 2 413 739 A | 11/2005 |
| JP | 10-210031 | 8/1998 |
| JP | 2001-60964 | 3/2001 |
| JP | 2001-69174 | 3/2001 |
| JP | 2003-153327 | 5/2003 |
| JP | 2005-027119 | 1/2005 |
| JP | 2005-287074 | 10/2005 |
| JP | 2006-86939 | 3/2006 |
| JP | 2006-148784 | 6/2006 |
| JP | 2007-96968 | 4/2007 |
| JP | 2007-180886 | 7/2007 |
| WO | WO 2006/086170 A3 | 8/2006 |
| WO | WO 2006/116620 A3 | 11/2006 |
| WO | WO 2007/013839 A1 | 2/2007 |

* cited by examiner

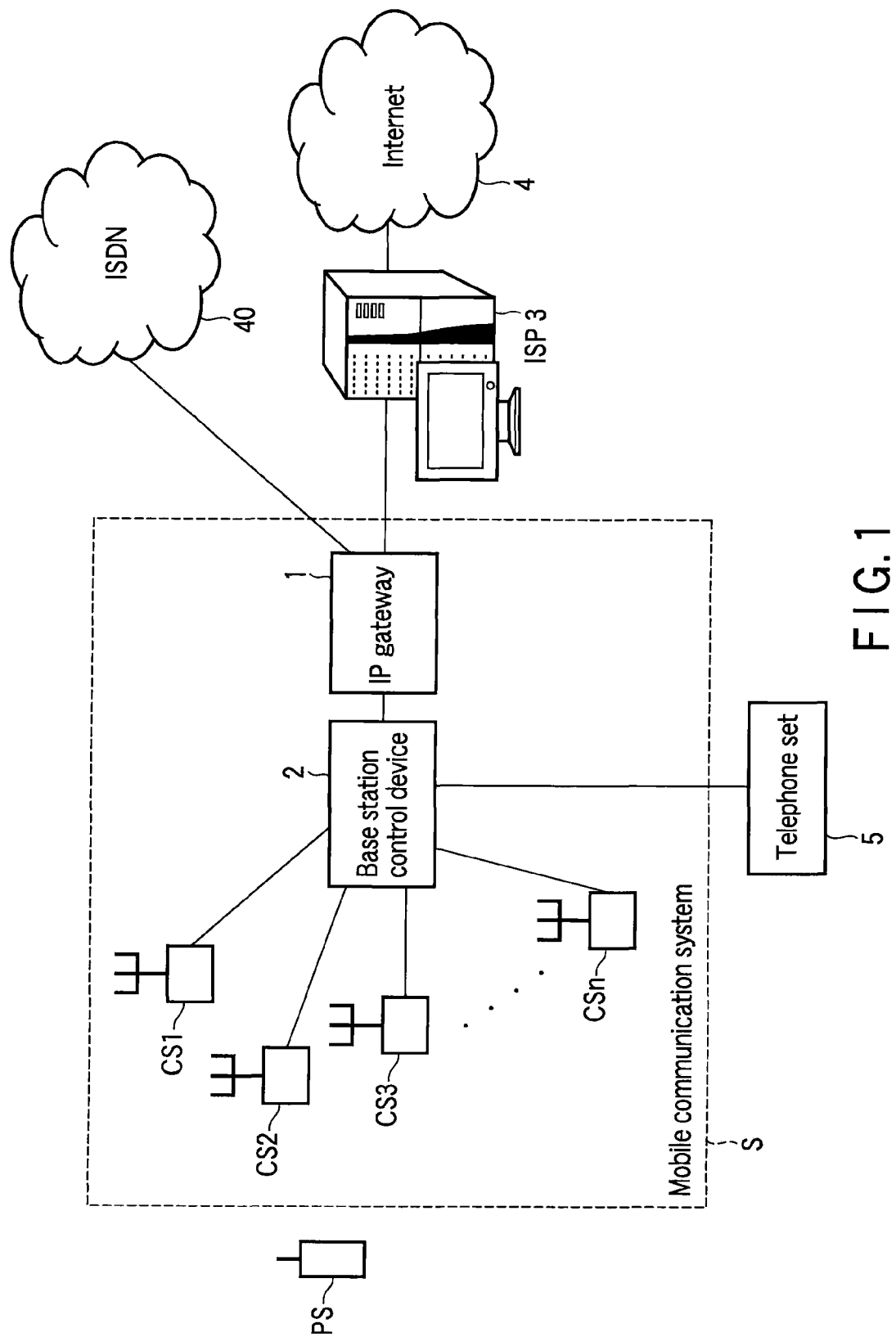
F I G. 1

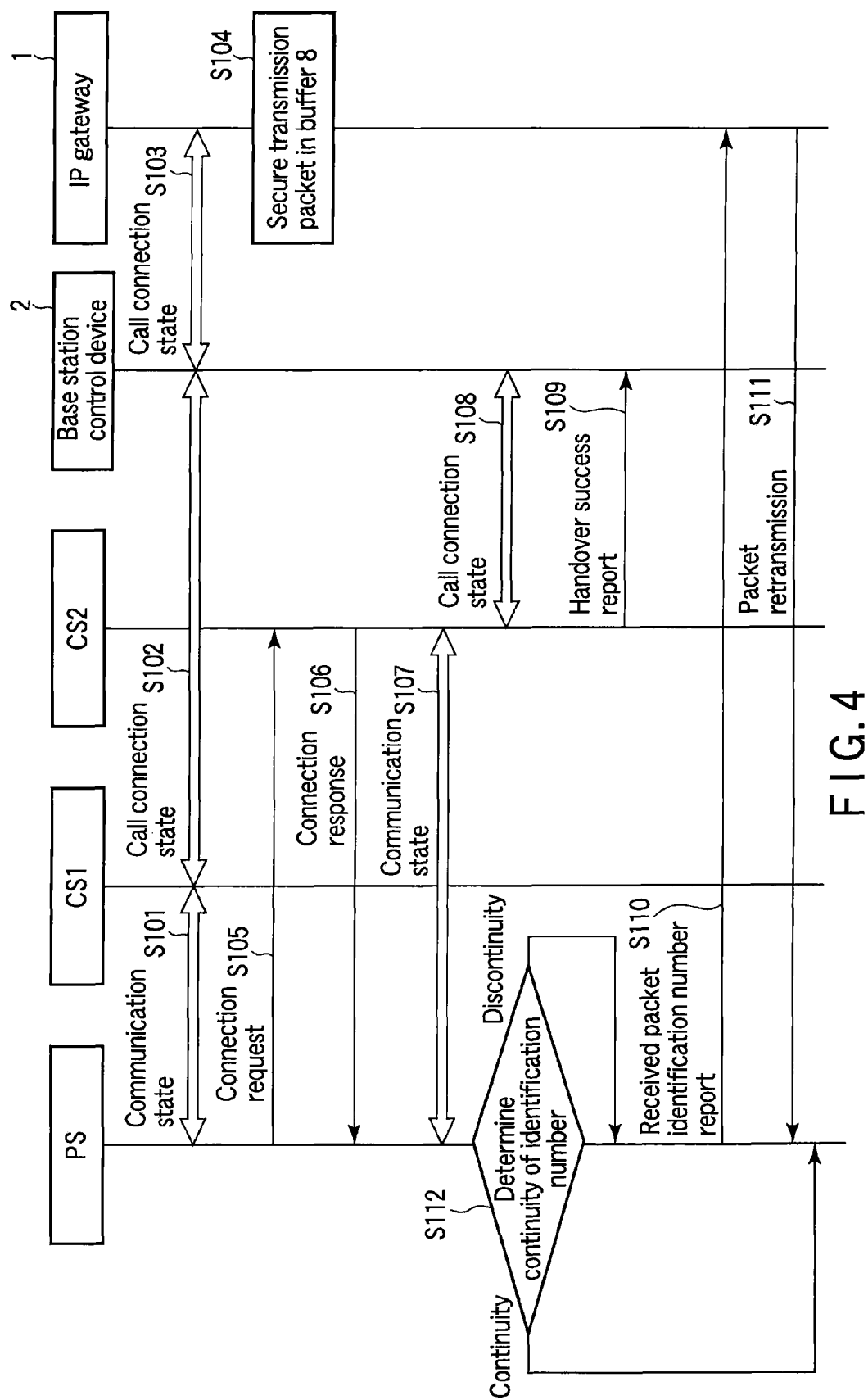
F I G. 4

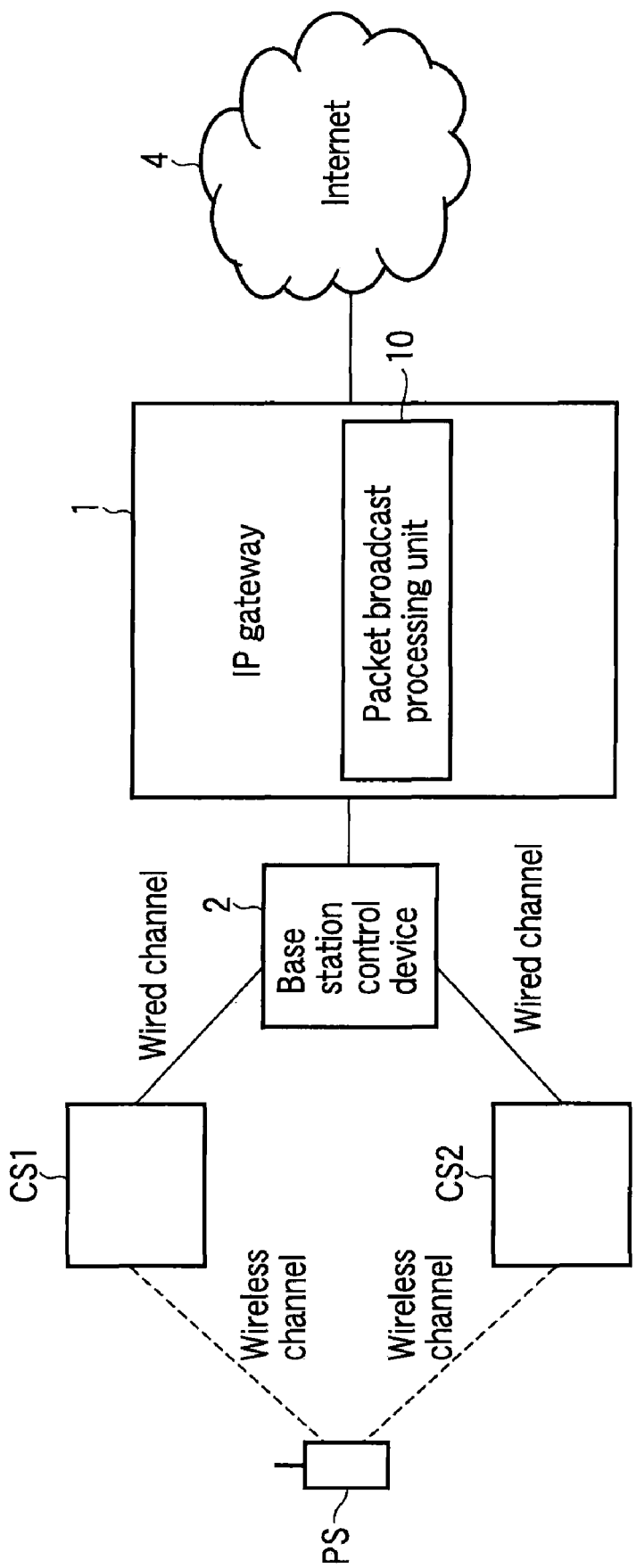
F I G. 5

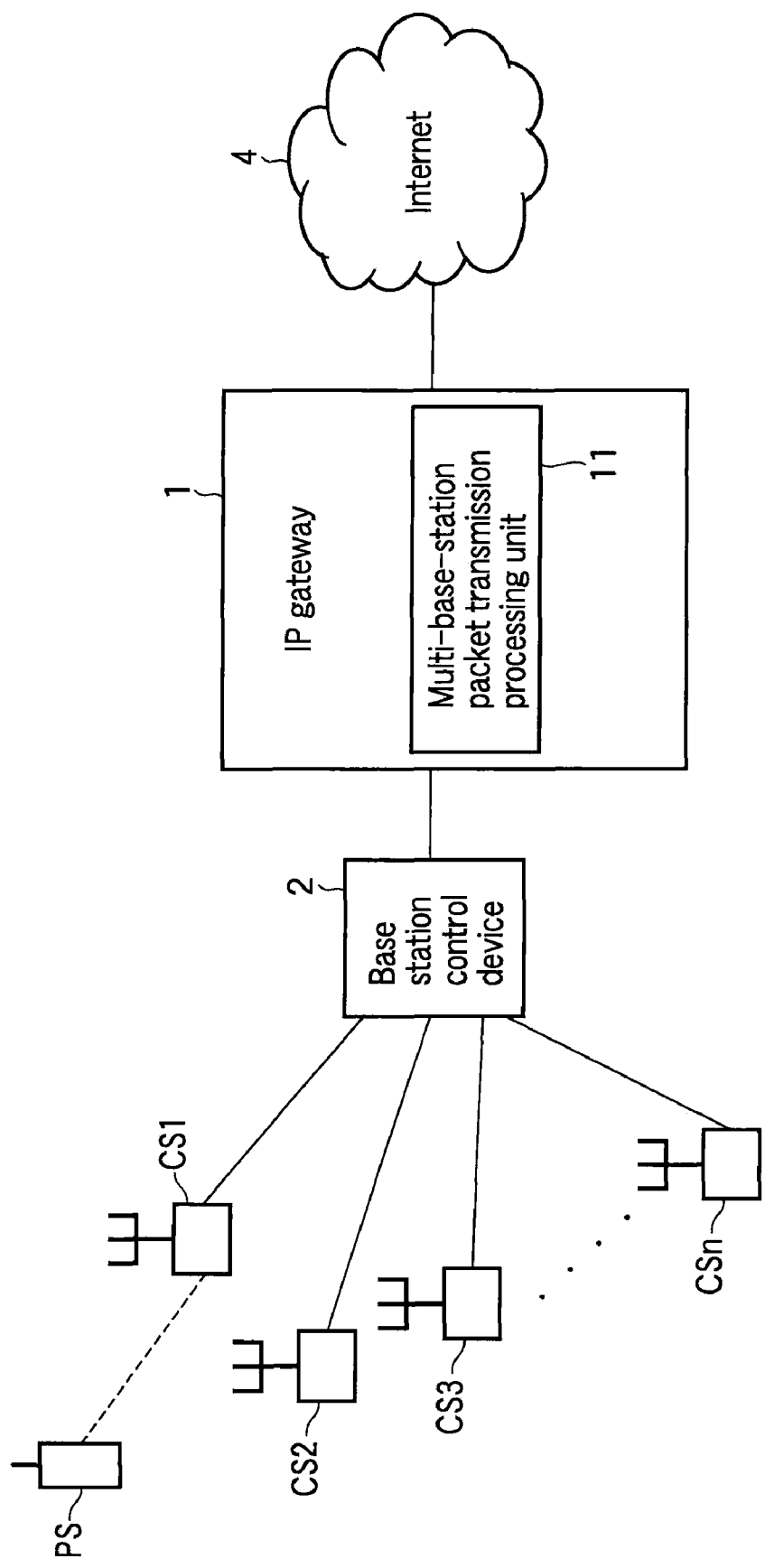
F I G. 6

MOBILE COMMUNICATION SYSTEM, GATEWAY, CONCENTRATOR, AND HANDOVER CONTROL METHOD

CROSS-REFERENCE TO RELATED APPLICATIONS

This application is based upon and claims the benefit of priority from prior Japanese Patent Application No. 2007-316364, filed Dec. 6, 2007, the entire contents of which are incorporated herein by reference.

BACKGROUND OF THE INVENTION

1. Field of the Invention

The invention relates to a mobile communication system which transfers a variety of items of multimedia data including voice in a packet data form such as an Internet Protocol (IP) packet, and a gateway, a concentrator, and a handover control method for use in the system of this kind. More specifically, the present invention relates to an improvement of handover processing accompanied by movement of a mobile terminal device.

2. Description of the Related Art

A mobile communication system including a personal handy-phone system (PHS) or a so-called cellular phone system has been expected to spread in future. Fusing with an IP network such as the Internet has been planed as well as extension of a communication bandwidth, and in recent years, transmission of the IP packet by means of a method of encapsulating and tunneling has been taken in account.

As widely known, the mobile communication system includes a plurality of base stations, and each base station individually forms a radio zone (refer to as an area or a cell). In an area, a radio terminal device (refer to as a mobile terminal) is wirelessly connected to the base station which develops the area. A mobile terminal moving to another area switches a communication partner from a station being in connection to a base station at a moving destination. This processing is called handover.

The communication between the mobile terminal and the base station is deteriorated as the mobile terminal comes close to an area boundary. In the existing mobile communication system, a method in which the mobile terminal detects this deterioration in communication, and the mobile terminal requires reconnection (calling) to the next base station is adopted (e.g., refer to Jpn. Pat. Appln. KOKAI Publication No. 2005-27119).

Meanwhile, in the existing technique, a packet loss accompanied by temporary deterioration of a communication environment before and after handover may not be avoided. While voice communication may overcome a slight packet loss, there is the danger of a loss of important information in transmission of an image or text data. Especially, if the mobile terminal moves at high speed, the situation gets worse because the handover is performed frequently and many packets are lost.

To prevent the packet loss, a method for confirming whether or not a mobile terminal may normally receive the image or the text data for each packet at every time is a possible approach. However, this method has to wait a response to confirm OK/NG of receptions, deteriorates a communication rate, and uselessly consumes the communication bandwidth and network resources. Retransmission control through a high order layer (TCP/IP) poses the same situation.

A technique aiming to solve such a failure is disclosed in Jpn. Pat. Appln. KOKAI. Publication No. 2003-153327. This document discloses a system which predicts a packet at a moment of switching of base stations and reports the packet number of the predicted packet to an exchanger. However, since such a system is burdened with prediction computation and a band for message transfer between the base station and the exchanger is occupied, a further effective method in stead of the system has been searched.

BRIEF SUMMARY OF THE INVENTION

As mentioned above, the existing mobile communication system has a failure in losing some packets in handover; a provision of a method for solving this problem has been expected. In a communication system in the future, since data communication having small resistance to a packet loss will dominate in comparison with voice communication, a method for effectively rescuing packets in an area further close to a physical layer has been desired.

An object of the invention is to provide a mobile communication system, a gateway, a concentrator, and a handover control method which prevent a packet loss accompanied by the handover.

According to an aspect of the present invention, there is provided a mobile communication system, comprising: a plurality of base stations which each form radio zones and store a mobile terminal; a gateway which is connected to a packet communication network and relays packet communication between the packet communication network and the mobile terminal; a packet buffer; a buffer processing unit which stores packets transmitted by a downlink to the mobile terminal in the packet buffer; and a retransmission processing unit which reads a packet required from the mobile terminal from the packet buffer to retransmit the packet to a mobile terminal that is a request source, wherein the mobile terminal includes a request processing unit which requires retransmission of unarrived packets to the retransmission processing unit in handover accompanied by movement between the radio zones, the capacity of the packet buffer is a capacity which is enough to store the packets transmitted by the downlink at least in a period from a start of to an end of the handover, the buffer processing unit which assigns serial identification numbers to the packets at least in the period from the start to the end of the handover to transmit the packets by the downlink and stores the packets in the packet buffer, and when identification numbers of the packets which have arrived at the mobile terminal are discontinuous, the request processing unit requires packet retransmission needed to eliminate the discontinuity to the retransmission processing unit.

The packet buffer, the buffer processing unit and the retransmission processing unit may be provided for the gateway. Or, if the system includes a concentrator (base station control device) which concentrates a plurality of base stations and has a management function for the base stations, the concentrator may be provided with the packet buffer, the buffer processing unit and the retransmission processing unit.

More specifically, according to the invention, identification numbers are given to packets at least in a time period from a start of the handover to an end thereof by using the handover as a momentum, and the packets in such a state are buffered. As long as distinguishable for each mobile terminal, the identification numbers may be serial numbers. The mobile terminal checks the continuity of the identification numbers, if any discontinuity is checked; an identifier of an immediately preceding packet is reported to the system. That is, the identification number of the last packet which has been normally received is reported to the system. In response to this report, the system successively retransmits in turn from the packet having the next identification number of the reported identification number to the mobile terminal of a report source.

With taking such a means, since the packets at a downlink are buffered by the gateway, even if any packet does not arrive at the mobile terminal in handover, the packet itself is not lost. In the invention, the processing regarding retransmission control of the packets is executed only for the handover, and there is no need to confirm OK/NG of the reception of each packet unlike a retransmission control flow at TCP/IP. Therefore, since the invention may retransmit packets only they are needed as well as may reduce the load in the high order layer, the processing in the physical layer may be performed at minimum.

According to the invention, there is provided, the mobile communication system, the gateway, the concentrator, and the handover control method which prevent packet losses accompanied by the handover.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is an exemplary system view depicting an embodiment of a mobile communication system S of the invention;

FIG. 4 is an exemplary sequence view depicting a processing procedure related to packet retransmission in the mobile communication system S of FIG. 3;

FIG. 5 is an exemplary functional block diagram depicting a second embodiment of the mobile communication system S of FIG. 1;

FIG. 6 is an exemplary functional block diagram depicting a third embodiment of the mobile communication system S of FIG. 1;

DETAILED DESCRIPTION OF THE INVENTION

[First Embodiment]

FIG. 1 shows a system view illustrating an embodiment of a mobile communication system of the invention. A mobile communication system S of FIG. 1 includes a plurality of base stations CS1-CSn which each form areas and store a mobile terminal PS; a base control device 2; and an IP gateway 1. Each mobile terminal PS has a function of being connected to a personal computer and a personal digital assistant (PDA) to transmit and receive a variety of pieces of multimedia data in addition to a voice communication function.

The control device 2 stores the base stations CS1-CSn, for example, through wired channels, and is connected to the gateway device 1. The control device 2 also has a variety of control functions such as channel assignment to the base stations CS1-CSn.

The gateway device 1 is connected to Integrated Service Digital Network (ISDN) 40, and to the Internet 4, for example, via an Internet service provider (ISP) 3. ISDN 40 is a connection type network for transmitting time division data, the Internet is a connectionless type network for transmitting IP packets, and they are different in type from each other. The gateway device 1 absorbs the difference in their protocol, and relays packet communication in the IP among each of the Internet 4, ISDN 40 and the mobile terminal PS. Other than this configuration, a telephone set 5 may be connected to the control device 2.

Figure 2:
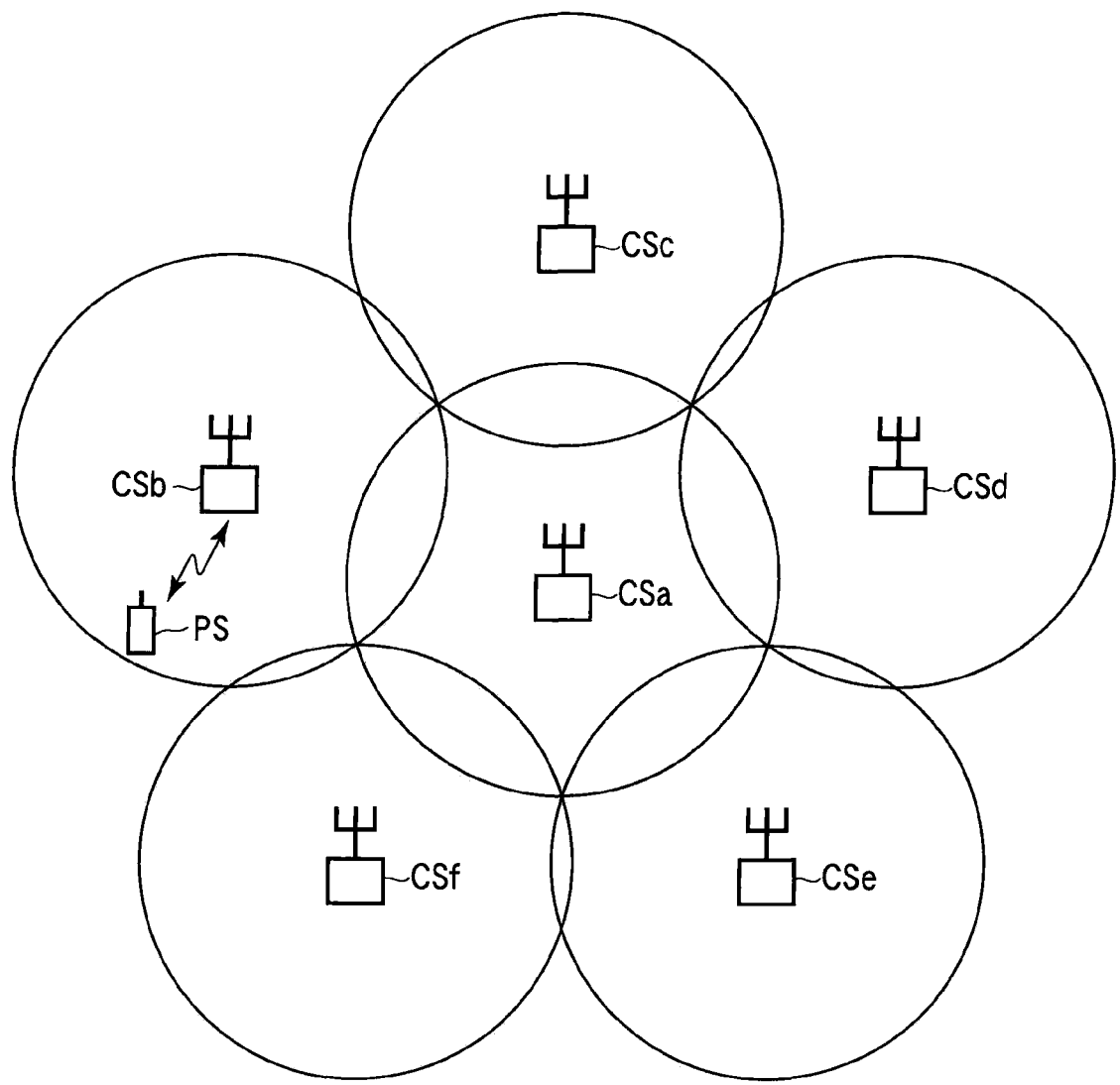
FIG. 2 is an exemplary schematic view depicting an example of an area formed of a plurality of base stations.

FIG. 2 is a schematic view illustrating an area to be formed of a plurality of base stations. Here, symbols CSa-CSf are put to the base stations, respectively. Each base station CSa-CSf individually forms a radio zone (area or cell). The mobile terminal PS is wirelessly connected to the base station (e.g., CSb) which develops its area in the area of the base station CSb.

Figure 3:
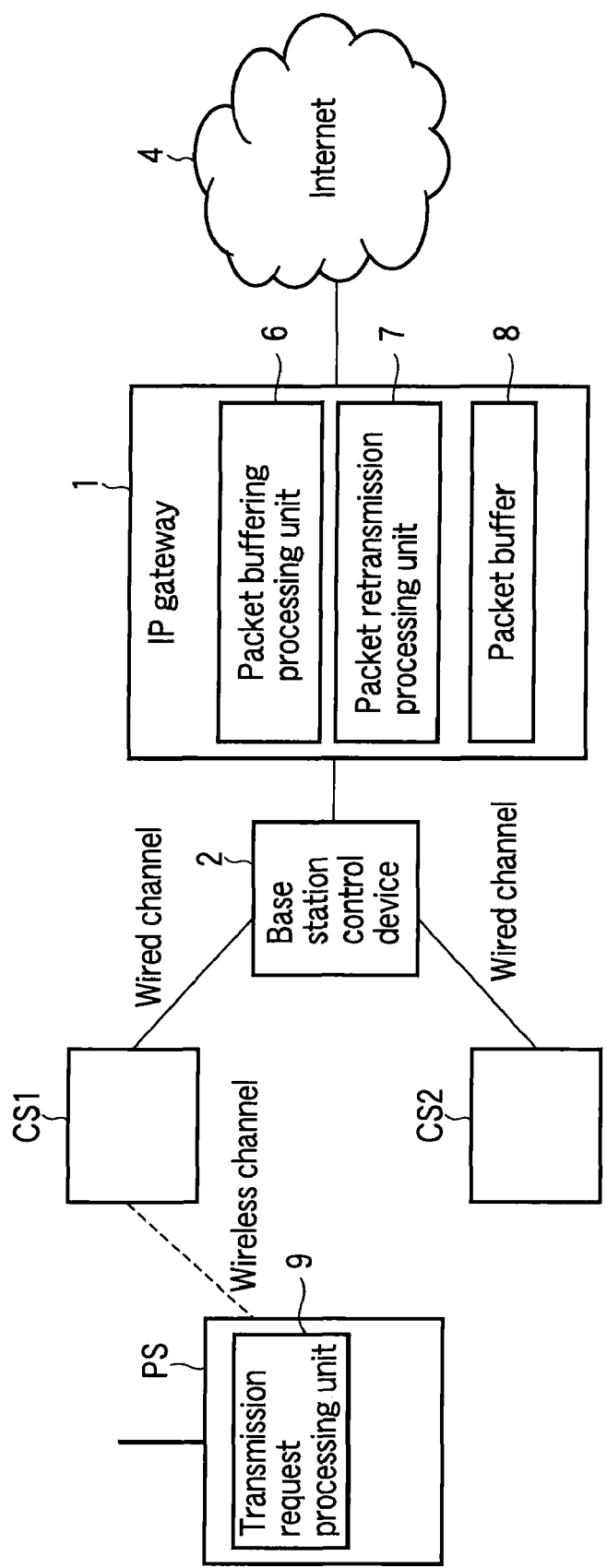
FIG. 3 is an exemplary functional block diagram depicting a detailed principal part of the mobile communication system S of FIG. 1.

FIG. 3 shows a functional block diagram illustrating the detailed principal of the system S. In FIG. 3, the IP gateway 1 includes a packet buffering processing unit 6; a packet retransmission processing unit 7; and a packet buffer 8. Among of them, the buffering processing unit 6 and the packet retransmission processing unit 7 are control functions mainly composed of software to be achieved through computing processing, for example, by a central processing unit (CPU), and the buffer 8 is a hardware memory such as a random access memory (RAM).

The buffering processing unit 6 holds packets transmitted by a downlink to the mobile terminal PS. It is assumed that the hold time period is at least a time which is longer than a handover period accompanied by the area movement of the mobile terminal PS. That is the capacity of the packet buffer 8 is set to a capacity which is enough to buffer a total amount of the packets generated in the handover period. If there are pluralities of mobile terminals PSs, the buffers 8 are provided for the respective mobile terminals PSs to store the downlink packets for the mobile terminals PSs, respectively.

The buffering processing unit 6 assigns identification numbers which are distinguishable for each terminal to the packets to be buffered. As regards a form for assigning the numbers, combining successive serial numbers, for example, with an identification numbers which are proper to the terminals is a possible approach. In short, the form of identification numbers may be a form which can distinguish the numbers at each terminal, and which can determine the continuity of the packets at a reception side. The packets to be transmitted by a downlink from the gateway device 1 also become ones to which the same identification numbers are assigned. That is, the packets to which the identification numbers are assigned by the gateway device 1 are copied, one is stored in the buffer 8 and the other is transmitted to the mobile terminal PS by a downlink. Here, regardless of presence or absence of a response from the mobile terminal PS, the gateway device 1 immediately transmits the copied packet as it is by a downlink.

In response to a request from the mobile terminal PS, the packet retransmission processing unit 7 reads the required packet from the packet buffer 8 to retransmit the packet to the mobile terminal PS that is a request source. A transmission request processing unit 9, namely, a functional unit newly provided for the mobile terminal PS transmits the request.

In a state where the mobile terminal PS is brought into handover, the request processing unit 9 reads the identification numbers of the packets which have reached from the base stations CS1, CS2 to inspect the continuity. If the identification numbers become discontinuous, it is recognized that the some packets have not arrived yet, that is, some packets are lost. The request processing unit 9 requires retransmission of the unarrived packets to the gateway device 1 so as to resolve the discontinuity. More specifically, the request processing unit 9 reports the last identification number of the successive identification numbers among the packets which have arrived at the mobile terminal PS to the transmission processing unit 7 of the gateway device 1. That is, if the serial numbers read from the received packets are (001), (002), (003), (004) and (007), the request processing unit 9 reports the number (004) to the retransmission processing unit 7. When receiving the number (004), the retransmission processing unit 7 reads packets in turn from the packet of the next number (005) in the packet buffer 8 to transmit the numbers to the mobile terminal PS.

The following will describe the operation of the configuration described above.

FIG. 4 shows a sequence view illustrating a processing procedure related to packet retransmission in the system of FIG. 3. It is assumed that the mobile terminal PS is firstly in communication in the area of the base station CS1, in this state, the base station CS1 and the mobile terminal PS, the base station CS1 and the base station control device 2, and the base station control device 2 and the IP gateway 1 are call-connected, respectively (S101, S102, S103). The gateway device 1 copies the transmission packet to store the copies in the packet buffer 8 while immediately transmitting the packets (S104). The buffer capacity is a minimum capacity to fulfill the handover period; the packets which exceeds the overhead period are discarded in turn.

When the mobile terminal PS moves and becomes close to the boundary of the area of the base station CS1, the communication quality gradually deteriorates from a defined level. The mobile terminal PS detects the deterioration, to require a new connecting destination base station, and, for example, transmits a connection request to the base station CS2 of which the reception density of a pilot signal is in a defined range (S105). The base station CS2 which has received this request returns a connection response to the mobile terminal PS (S106), and a radio link (calling) is connected between the mobile terminal PS and the base station CS2 (S107). The mobile terminal PS transmits a handover request to the base station CS2, a call connection between the control device 2 and the base station CS2 is also made (S108), and the base station CS2 transmits a handover success report to the control device 2 (S109).

The establishment of a session among the mobile terminal PS, the base station control device 2 and the IP gateway 1 starts through the base station CS2. For the procedure, for example, a Session initiation protocol (SPI) procedure may be used.

When a session is established between the mobile terminal PS and the IP gateway 1, the gateway device 1 further establishes a session to and from the base station CS2 while maintaining the session and communication to and from the mobile terminal PS through the base station CS1. In this way, the handover of the mobile terminal PS from the base station CS1 to the base station CS2 is executed.

In a process so far, the mobile terminal PS checks the continuity of the identification numbers assigned to the reached packets (Step S112). If the continuity is maintained, the handover ends as it is, if any discontinuity is hound, the mobile terminal PS assumes that some packets have not arrived yet and requires retransmission of the packets.

That is, after the handover has ended normally, the mobile terminal PS reports the identification number of the last packet among the received packets to the gateway device 1 (S110). The gateway device 1 reads the packets having the next numbers in turn from the buffer 8 for the mobile terminal PS on the basis of the reported identification numbers, and sequentially retransmits the read identification numbers in turn (S111). When the retransmission is completed, the packet transmission through the base station CS2 is started after this.

As described above, in this embodiment, the IP gateway 1 includes the packet buffer 8 to be secured for each mobile terminal; the packet buffering processing 6 holding the downlink packets over the handover period; and the packet buffering processing unit 7 retransmitting the packets in response to the request from mobile terminal PS. The mobile terminal PS is provided with the transmission request processing unit 9 requiring retransmission of unarrived packets to the gateway device 1 in handover. When receiving a handover report from the mobile terminal PS, the buffering processing unit 6 assigns serial identification numbers to the downlink packets. The mobile terminal PS checks the continuity of the identification numbers of the reached packets, if the discontinuity is found; the mobile terminal PS reports the identification number of the last packet among the continuous packets to the gateway device 1. The gateway device 1 reads the packets in turn from the reported next number and retransmits the packets.

As configured like this, even when any packet which cannot be received by the mobile terminal PS in handover, the packet itself is not lost. Since the buffering of the packets and adding of the identification numbers are started by the handover as a momentum, resource consumption in stationary time may be suppressed at a minimum. Further, since the presence or absence of the unarrived packets may be detected by checking the serial numbers of the packets on the side of the mobile terminal PS, the processing load may be lightened, and the processing at a high order layer level may be reduced. Based on these facts, it becomes able to easily prevent packet losses caused by the handover.

[Second Embodiment]

FIG. 5 is a functional block diagram illustrating a second embodiment of the mobile communication system S of FIG. 1. In FIG. 5, the same component as that of FIG. 3 is designated by the identical symbol, and only different parts from those of FIG. 3 will be described hereinafter. In FIG. 5, the IP gateway 1 includes a packet broadcast processing unit 10. In short, the broadcast processing unit 10 copies the downlink packets to the mobile terminal PS over a period from the start to end of the handover, and transmits the packets by broadcasting to both the base stations CS1, CS2 related to the handover.

In the second embodiment, for the handover, a radio link is formed among the two base stations of the base station CS1 (handover source) and the base station CS2 (handover destination) and the mobile terminal PS. Usually, the packet to the mobile terminal PS is transmitted to the base station CS1 in which a position of the mobile terminal PS is registered. It is assumed that the mobile terminal PS is in a state of IP communication through the base station CS1.

Also in this embodiment, the mobile terminal PS which has detected the deterioration in communication quality transmits a handover request to the base station CS2 in the same way of the first embodiment. After this, through the same procedure in FIG. 4, when an SIP connection is established between the mobile terminal PS and the IP gateway 1 through the base station CS2, the broadcast processing unit 10 of the gateway device 1 transmits the same packet to the base stations CS1, CS2 in link connection with the mobile terminal PS. At last, the route to the mobile terminal PS is switched from the base station CS1 to the base station CS2, and the system s terminates the handover.

In this way, also for the handover, the packet loss in handover may be prevented by transmitting the same packet by broadcasting to the two base stations to which the mobile terminal PS is now connected.

[Third Embodiment]

While the second embodiment has transmitted the identical packets to the two base stations regarding the handover, the invention is not limited to the mobile communication system having two base stations and the packets may be transmitted by broadcasting to a plurality of base stations.

FIG. 6 shows a functional block diagram illustrating a third embodiment of the mobile communication system S of FIG. 1. In FIG. 6, the IP gateway 1 is provided with a multi-base-station packet transmission processing unit 11. The transmission processing unit 11 transmits the same packet to the plurality of base stations CS1-CSn in handover of the mobile terminal PS.

In this embodiment, when a handover request is transmitted from the mobile terminal PS, the gateway device 1 also transmits the identical packets to the base stations CS2-CSn under the management by the same base station control device 2 as that of the base station CS1 to which the mobile terminal PS is now connected. That is, the gateway device 1 copies packets by a plurality of base stations. Or, the packet to be transmitted from the IP gateway 1 may be set to one, and the control device 2 may copy the transmitted one packet.

In this embodiment, the mobile terminal PS does not specify the base station for establishing the session, and transmits a handover request. The IP gateway 1 which has received the handover request and the mobile terminal PS establish a session to and from the base stations which have selected respectively on the basis of a defined selection reference, and performs the packet retransmission procedure which is similar to that of FIG. 4. The reference to decide which of the base stations should be selected among the plurality of base stations depends on engineering developments in future.

In this way, providing the function of transmitting the identical packets to all the base stations to be managed by the same base station control device 2 for the IP gateway 1 enables normally receiving the packet after handover even when the mobile terminal PS moves to any one area of adjacent base stations CS2-CSn from the area of the base station CS1. That is, the packet losses may be prevented.

[Fourth Embodiment]

Figure 7:
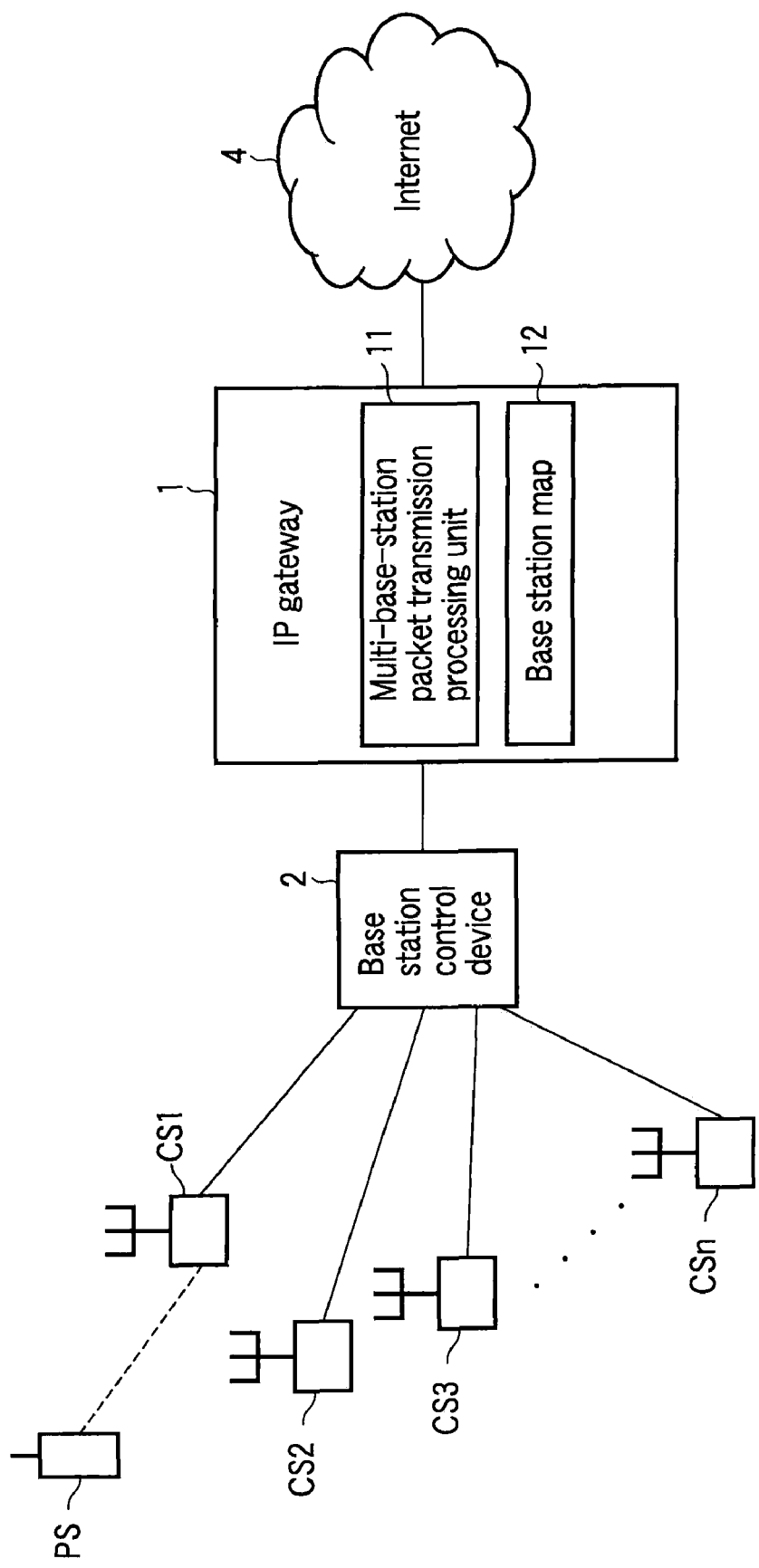
FIG. 7 is an exemplary functional block diagram depicting a fourth embodiment of the mobile communication system S of FIG. 1.

FIG. 7 shows a functional block diagram illustrating a fourth embodiment of the mobile communication system S of FIG. 1. In the fourth embodiment, the IP gateway 1 includes a base station map 12 in addition to the configuration of FIG. 6. The map 12 is used for managing relative location of each base station CS1-CSn, and if there are increases in base station, the map 12 is updated at every time.

In the embodiment, for transmitting by broadcasting of packets to the plurality of base stations, the multi-base-station transmission processing unit 11 refers to the map 12 to select a base station for a transmission destination. That is, it is more mobile terminal PS's advantageous to set some base stations close to the base station CS1 in position-registration rather than setting all the base stations as objects from the point of view of effective use of a bandwidth. The bases stations close to the base station CS1 may be obtained by use of an adjacent distance threshold which is set by the gateway device 1, the mobile communication system defines all the base stations within distances not far from the threshold from the base station CS1 as adjacent base stations of the base station CS1.

Figure 8:
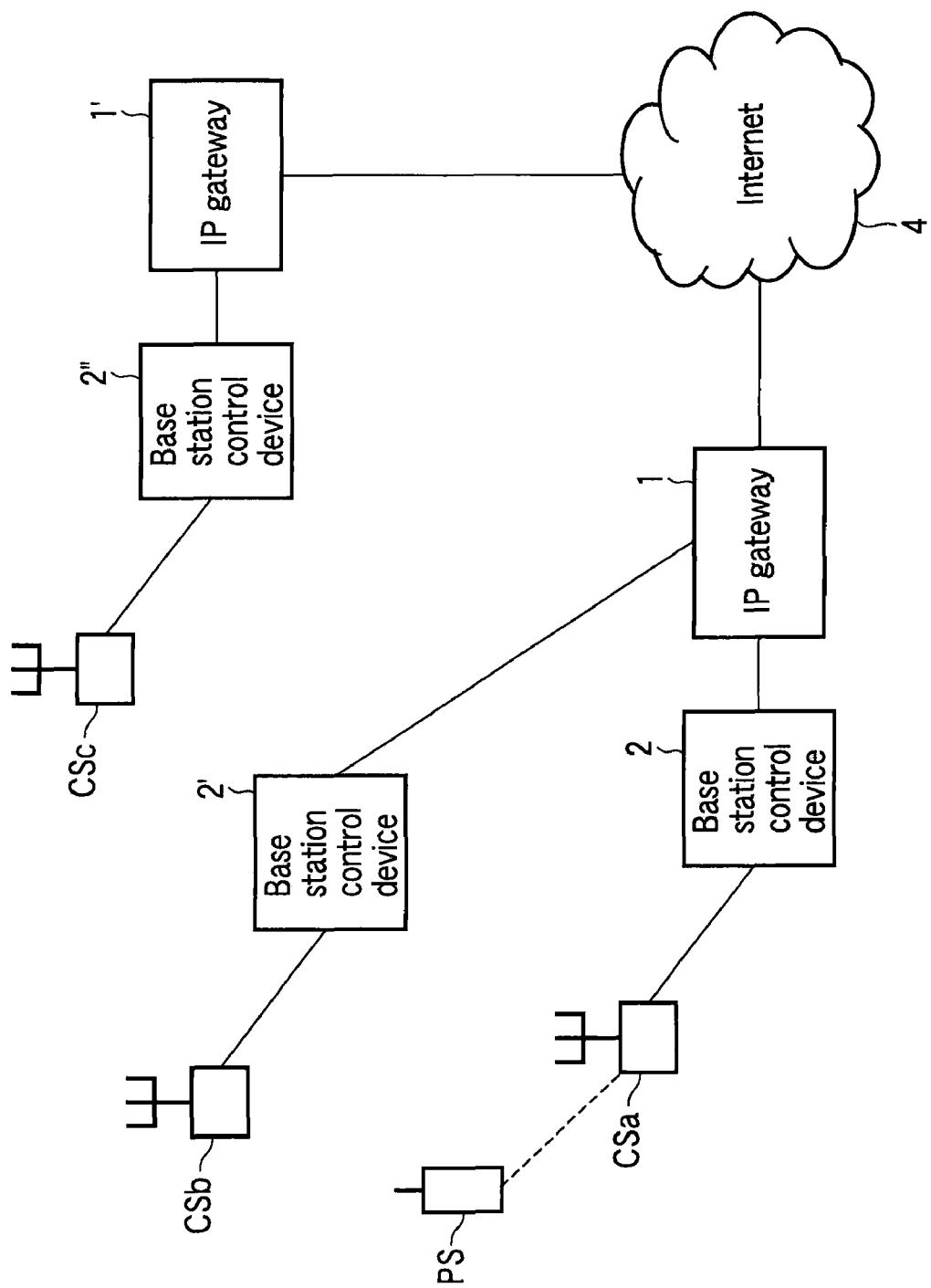
FIG. 8 is an exemplary schematic view depicting an assumable system environment in the fourth embodiment of the invention.

FIG. 8 shows a schematic view illustrating a system environment which is assumed in the fourth embodiment. In FIG. 8, a plurality of IP gateways 1, 1' are installed; base station control devices 2, 2', and a base station control device 2" are connected to the IP gateway 1 and an IP gateway 1', respectively. The control devices 1, 2', 2" stores bases stations CSa, CSb, CSc, respectively.

In such an environment, when the mobile terminal PS performs the handover from the base station CSa to the base station CSb, the system may easily specify the base stations to which the packets should be transmitted by broadcasting in a manner that the gateway device 1 refers to the base station map 12. In a case where the mobile terminal PS performs the handover from the base station CSb to the base station CSc, the system is further becomes effective. While the base stations CSb, CSc are under IP gateways 1, 1' differing from each other, there is some possibility of being adjacent to each other in construction of the system. Therefore, providing the base station map 12 showing positions of the base stations belonging to another IP gateway 1' for the IP gateway 1 enables specifying the base station CSc of a partner destination for transmission by broadcasting.

In this way, in this embodiment, the system includes the map 12 at the IP gateway 1 so as to narrow the base stations to which the packets should be transmitted by broadcasting. Thus, the system may transmit the packets by broadcasting in a further intelligent form, and may prevent packet losses while keeping the consumption of communication resources to a minimum.

The invention is not limited to the aforementioned embodiments. For instance, while in the above embodiments, the IP gateway 1 has been provided with the packet buffering processing unit 6, the packet retransmission processing unit 7 and the packet buffer 8, the base station control device 2 may be provided with them. The base station map 1 may be positioned at any place. Of course, each functional processing unit may be disposed by distributing to the gateway device 1 and the control device 2. In response to various system requests, such as a concentration effect, cost effectiveness and a CPU load, a variety of implements are possible approaches.

In the first embodiment, the buffering of the packets and the addition of the identification numbers have started by using the handover as a trigger. Replacing with above, the buffering of the packets and the addition of the identification numbers may be constantly performed on a steady basis. Thereby, packet losses in a time lag from the occurrence of the handover up to the recognition of the occurrence of the handover by the gateway may be prevented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication system, comprising:
a plurality of base stations forming radio zones;
a mobile terminal which performs handover as the mobile terminal moves among the radio zones; and
a gateway connected to a packet communication network for relaying packet communication between the packet communication network and the mobile terminal via a base station, the gateway including:
a packet buffer with a capacity large enough to store packets transmitted in a downlink in a period at least from a start to an end of a handover;
a buffer processing unit for storing packets transmitted by the downlink to the mobile terminal in the packet buffer and for assigning serial identification numbers to the packets in the period at least from the start to the end of the handover, wherein the buffer processing unit begins the storing and assigning in response to the start of the handover; and
a retransmission processing unit for reading a packet requested by the mobile terminal from the packet buffer to retransmit the packet to the mobile terminal, wherein
the mobile terminal further includes a request processing unit for requesting retransmission of unarrived packets in the handover to the retransmission processing unit, wherein the request processing unit requests packet retransmission to the transmission processing unit to eliminate a discontinuity to the retransmission processing unit when identification numbers of the packets that have arrived at the mobile terminal are discontinuous.

2. The system according to claim 1, wherein the buffer processing unit transmits the packets with the identification numbers assigned thereto by the downlink.

3. The system according to claim 1, wherein
the request processing unit reports the last identification number of serial identification numbers among packets which have arrived at the mobile terminal to the retransmission processing unit; and
the retransmission processing unit retransmits the packets in turn from a packet having the next identification number of the reported identification number.

4. The system according to claim 1, wherein
the packet buffers are provided for each of a plurality of mobile terminals; and
the buffer processing unit stores the packets in each packet buffer for each of the plurality of mobile terminals.

5. The system according to claim 1, wherein the gateway is provided with the packet buffer; the buffer processing unit; and the retransmission processing unit.

6. The system according to claim 1, further comprising:
a concentrator which concentrates the plurality of base stations to connect them to the gateway, and has a management function for the plurality of base stations, wherein
the concentrator includes the packet buffer, the buffer processing unit, and the retransmission processing unit.

7. A gateway for a mobile communication system, the mobile communication system including a plurality of base stations forming radio zones, and a mobile terminal which performs handover as the mobile terminal moves among the radio zones, the gateway connected to a packet communication network and comprising:
a relay for relaying packet communication between the packet communication network and the mobile terminal;
a packet buffer with a capacity large enough to store packets transmitted by a downlink in a period at least from a start to an end of a handover;
a buffer processing unit for storing packets transmitted by the downlink to the mobile terminal in the packet buffer and for assigning serial identification numbers to the packets in the period at least from the start to the end of the handover, wherein the buffer processing unit begins the storing and assigning in response to the start of the handover; and
a retransmission processing unit for reading a packet requested by the mobile terminal from the packet buffer to retransmit the packet to the mobile terminal when the mobile terminal moves through the handover.

8. The gateway according to claim 7, wherein
the buffer processing unit transmits by the downlink the packets to which the identification numbers are assigned.

9. The gateway according to claim 7, wherein the retransmission processing unit retransmits the packets in turn from a packet having the next identification number of the identification number reported from the mobile terminal.

10. The gateway according to claim 7, wherein
the packet buffers are provided for each of a plurality of mobile terminals; and
the buffer processing unit stores the packets in each packet buffer for each of the plurality of mobile terminals.

11. A handover control method for a mobile communication system comprising a plurality of base stations forming radio zones, a mobile terminal which performs handover as the mobile terminal moves among the radio zones, and a gateway connected to a packet communication network that relays packet communication between the packet communication network and the mobile terminal via a base station, the method comprising:
buffering packets transmitted by a downlink, in response to the start of a handover, to the mobile terminal in a packet buffer;
requesting retransmission of unarrived packets in the handover;
reading the packet requested by the mobile terminal to retransmit the packet to the mobile terminal;
assigning serial identification numbers, in response to the start of a handover, to packets at least from a start to an end of the handover; and
requesting retransmission of packets, by the mobile terminal, when the identification numbers of the reached packets are discontinuous, to eliminate the discontinuity.

12. The method according to claim 11, wherein the packets with the identification numbers assigned thereto are transmitted by the downlink.

13. The method according to claim 11, wherein
the mobile terminal reports the last identification number of serial identification numbers among the reached packets to the mobile terminal; and
the mobile communication system retransmits the packets in turn from a packet having the next identification number of the reported identification number.

* * * * *